United States Patent
Castinado

(10) Patent No.: US 11,212,106 B2
(45) Date of Patent: Dec. 28, 2021

(54) DATA PROTECTION USING UNIVERSAL TAGGING

(71) Applicant: BANK OF AMERICA CORPORATION, Charlotte, NC (US)

(72) Inventor: Joseph Benjamin Castinado, North Glenn, CO (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 395 days.

(21) Appl. No.: 16/237,762

(22) Filed: Jan. 2, 2019

(65) Prior Publication Data

US 2020/0213124 A1    Jul. 2, 2020

(51) Int. Cl.
*H04L 9/32*    (2006.01)
*G06F 21/64*   (2013.01)

(52) U.S. Cl.
CPC ............ *H04L 9/3239* (2013.01); *G06F 21/64* (2013.01); *H04L 9/3231* (2013.01); *H04L 9/3247* (2013.01); *H04L 2209/08* (2013.01); *H04L 2209/38* (2013.01)

(58) Field of Classification Search
CPC ... H04L 9/3239; H04L 9/3247; H04L 9/3231; H04L 2209/08; H04L 2209/38; G06F 21/64
See application file for complete search history.

(56) References Cited

U.S. PATENT DOCUMENTS

| | | |
|---|---|---|
| 689,550 A | 12/1901 | Klerx |
| 6,148,093 A | 11/2000 | McConnell et al. |
| 6,895,507 B1 | 5/2005 | Teppler |
| 7,066,382 B2 | 6/2006 | Kaplan |
| 7,187,267 B2 | 3/2007 | Cole |
| 7,539,867 B2 | 5/2009 | Bolosky et al. |
| 7,587,368 B2 | 9/2009 | Felsher |
| 7,669,051 B2 | 2/2010 | Redlich et al. |
| 7,694,133 B2 | 4/2010 | Sibert |
| 7,792,791 B2 | 9/2010 | Smolen et al. |
| 2005/0160272 A1 | 7/2005 | Teppler |
| 2011/0231645 A1 | 9/2011 | Thomas et al. |
| 2015/0186366 A1 | 7/2015 | Yan et al. |
| 2016/0261411 A1 | 9/2016 | Yau et al. |
| 2016/0283920 A1 | 9/2016 | Fisher et al. |
| 2016/0283941 A1 | 9/2016 | Andrade |
| 2017/0046651 A1* | 2/2017 | Lin ................... H04L 9/0861 |
| 2017/0132625 A1* | 5/2017 | Kennedy ........... G06F 16/2379 |
| 2017/0331810 A1* | 11/2017 | Kurian ............... H04L 9/3213 |
| 2017/0352027 A1 | 12/2017 | Zhang et al. |

(Continued)

*Primary Examiner* — Matthew Smithers
*Assistant Examiner* — Mirza Israr Javed
(74) *Attorney, Agent, or Firm* — Moore & Van Allen PLLC; James C. Edwards

(57) ABSTRACT

A universal tag linked to the content of a data file for protecting the authenticity of the data file and/or the owner/creator of a digital file. The universal tag is linked to the content in the data file via one or more input keys/seeds that are used to generate the universal tag and rely on data associated with the content. Once generated, the universal tag is registered on a distributed ledger of at least on distributed trust computing network, which acts as a source of truth to validate the universal tag and, as such, validate (i) an authenticity of the data file, and/or (ii) the user associated with the data file (e.g., rightful possessor and/or creator of the digital file).

15 Claims, 6 Drawing Sheets

(56) References Cited

U.S. PATENT DOCUMENTS

| | | | |
|---|---|---|---|
| 2018/0103042 A1* | 4/2018 | Castagna | H04L 63/0428 |
| 2020/0042721 A1* | 2/2020 | Castinado | H04L 9/3239 |
| 2020/0213122 A1* | 7/2020 | Castinado | H04L 9/3239 |
| 2020/0213124 A1* | 7/2020 | Castinado | G06F 21/64 |
| 2021/0073019 A1* | 3/2021 | Murray | H04L 9/0637 |

* cited by examiner

DATA PROTECTION USING UNIVERSAL TAGGING

FIELD OF THE INVENTION

The present invention is generally directed to data security and, more specifically, providing data verification via registration of a universal tag within a distributed trust (e.g., blockchain) computing network.

BACKGROUND

In today's digital world the concern persists that a document or other digital work/file may have been tampered with or otherwise compromised. In this regard, the rightful possessor or a wrongful entity may alter the document or digital work/file for their benefit. For example, parties to signed contract/agreement may desire to nefariously change terms of the contract/agreement after the contract/agreement has been entered into or an individual may desire to change information on a digital birth certificate to show a different date of birth or name. Using conventional hacking techniques such changes can be made without leaving a footprint on the document or digital work/file (i.e., without impacting the metadata or making known that the document or digital work/file has been edited).

Similarly, digital works, such as intellectual property (e.g., music, video books, digital art, formulas, inventions and the like) are susceptible to wrongful entities either altering the work or claiming the work as their own. Once again, such alterations can occur without absent changes to the metadata or otherwise indicating that an edit has occurred.

Therefore, a need exits to verify and register, upon creation, digital files, such as contracts, purchase agreements, formal documents (e.g., birth certificates, marriage licenses, and the like), digital works/intellectual property (e.g., music, video, books, formulas/inventions and the like). The verification and registration may include verifying the content as well as the creator/author for the purpose of insuring that any wrongful subsequent altering/changes to the digital file or claim of ownership/creation of the digital file can be easily detected and/or disavowed.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like for protecting the authenticity of data files and/or the owner/creator of a digital file through creation and registration of universal tags. As previously discussed many data files are susceptible to wrongful alteration and/or claims of ownership/creation, the present invention serves to detect and/or prevent such wrongful alteration and/or claims of ownership/creation by generating a unique universal tag and registering the universal tag with a distributed trust computing network, which serves as a source of truth/verification for the universal tag. In this regard, a trusted entity (e.g., government agency, financial institution or the like) may serve as the entity that generates and registers the universal tag, which serves as the official identifier (e.g., fingerprint, birthmark or the like) for entire lifecycle of the data file.

In specific embodiments of the invention the universal tag is generated by implementing a hash algorithm that uses one more input keys as the seed values. In specific embodiments of the invention, the input keys include one or more, and in some embodiments all of, (1) a first key comprising a randomized digital representation of at least a portion of the data file, (2) a second key comprising data associated with at least one selected from the group of (i) the user (e.g., digital signature of the user and biometric data and the like), and (ii) an origin of the data file (e.g., a date, a time and/or a geographic location at which the data file was created), and (3) a third key comprising a randomized input provided by the validating entity. Once the universal tag is generated it is registering through storage within a distributed ledger of at least one distributed trust computing network. The distributed trust computing network is configured to verify the universal tag and, in doing so, validates at least one of (i) an authenticity of the data file, and (ii) the user associated with the data file (e.g., rightful possessor and/or creator of the digital file).

A system for data protection provides for first embodiments of the invention. The system includes at least one distributed trust computing network that includes a plurality of decentralized nodes. Each decentralized node has a first memory and at least one first processor in communication with the memory. The first memory of the decentralized nodes is configured to store at least one distributed ledger comprising a plurality of blocks of data. The system additionally includes a computing platform disposed in a distributed computing network and including a second memory and at least one second processor in communication with the second memory. The second memory stores instructions that are executable by the second processor and configured to receive one or more keys configured for generating a universal tag linked to a data file associated with a user and apply the one or more keys to a hash algorithm to generate the universal tag. The instructions are further configured to register the universal tag within a block of at least one distributed ledger stored or accessible to one or more of the at least one distributed trust computing networks. The registering of the universal tag within the one or more distributed trust computing networks provides for validating at least one selected from the group of (i) an authenticity of the data file, and (ii) the user associated with the data file.

In specific embodiments of the system, the one or more keys include at least one of, and in specific embodiments all of, (1) a first key comprising a randomized digital representation of at least a portion of the data file, (2) a second key comprising data associated with at least one selected from the group of (i) the user (e.g., digital signature of the user and biometric data and the like), and (ii) an origin of the data file (e.g., a date, a time and/or a geographic location at which the data file was created), and (3) a third key comprising a randomized input provided by the instructions or a validating entity.

In other specific embodiments of the system, the data file associated with the user is one of (i) a document to which the user is a party to (e.g., contract, birth/marriage certificate, purchase agreement or the like), or (ii) intellectual property created by the user (e.g., song/audio, multimedia/video, book, formula or the like).

In other specific embodiments of the system, the instructions are further configure to create a coded representation (e.g., bar code, QR code or the like) of the universal tag, wherein the coded representation is configured to be decoded (e.g., scanned) to provide validation of at least one selected from the group of (i) the authenticity of the data file, and (ii) the user associated with the data file. In related specific embodiments of the system the instructions are further configured to embed the coded representation within digital reproductions of the data file.

In still further specific embodiments of the system, the instructions are further configured to apply the universal tag to the hash algorithm (i.e., de-hash) to validate the one or more keys.

A computer-implemented method for data protection defines second embodiments of the invention. The computer-implemented method is implemented by one or more processing devices. The method includes receiving one or more keys configured for generating a universal tag linked to a data file associated with a user and applying the one or more keys to a hash algorithm to generate the universal tag. The method further includes registering the universal tag within a block of at least one distributed ledger stored or accessible to one or more distributed trust computing networks. The registering of the universal tag within the one or more the distributed trust computing networks provides for validating at least one selected from the group of (i) an authenticity of the data file, and (ii) the user associated with the data file.

In specific embodiments of the method receiving one or more keys further includes receiving at least one of, and in some embodiments all of, a first key comprising a randomized digital representation of at least a portion of the data file, a second key comprising data associated with at least one selected from the group of (i) the user, and (ii) an origin of the data file, and/or a third a randomized input provided by the instructions or a validating entity.

In further specific embodiments the computer-implemented method includes creating a coded representation of the universal tag. The coded representation is configured to be decoded to provide validation of at least one selected from the group of (i) the authenticity of the data file, and (ii) the user associated with the data file. In such embodiments the computer-implemented method may further include embedding the coded representation within digital reproductions of the data file.

A computer program product including a non-transitory computer-readable medium defines third embodiments of the invention. The computer-readable medium includes a first set of codes for causing a computer to receive one or more keys configured for generating a universal tag linked to a data file associated with a user. Additionally, the computer-readable medium includes a second set of codes for causing a computer to apply the one or more keys to a hash algorithm to generate the universal tag. In addition, the computer-readable medium includes a third set of codes for causing a computer to register the universal tag within a block of at least one distributed ledger stored or accessible to one or more distributed trust computing networks. The registering of the universal tag within the one or more the distributed trust computing networks provides for validating at least one selected from the group of (i) an authenticity of the data file, and (ii) the user associated with the data file.

In specific embodiments of the computer program product, the first set of codes is further configured to cause the computer to receive at least one of selected from the group of receiving (1) a first key comprising a randomized digital representation of at least a portion of the data file, (2) a second key comprising data associated with at least one selected from the group of (i) the user, and (ii) an origin of the data file, and (3) a third key comprising a randomized input provided by a validating entity.

Thus, according to embodiments of the invention, which will be discussed in greater detail below, the present invention provides for protecting the authenticity of data files and/or the owner/creator of a digital file through generation and registration of universal tag. The universal tags are linked to the content in the data file via one or more input keys/seeds that are used to generate the universal tag and rely on data associated with the content. Once generated, the universal tag is registered on a distributed ledger of at least on distributed trust (e.g., blockchain) computing network, which acts as a source of truth to validate the universal tag and, as such, validate (i) an authenticity of the data file, and/or (ii) the user associated with the data file (e.g., rightful possessor and/or creator of the digital file).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
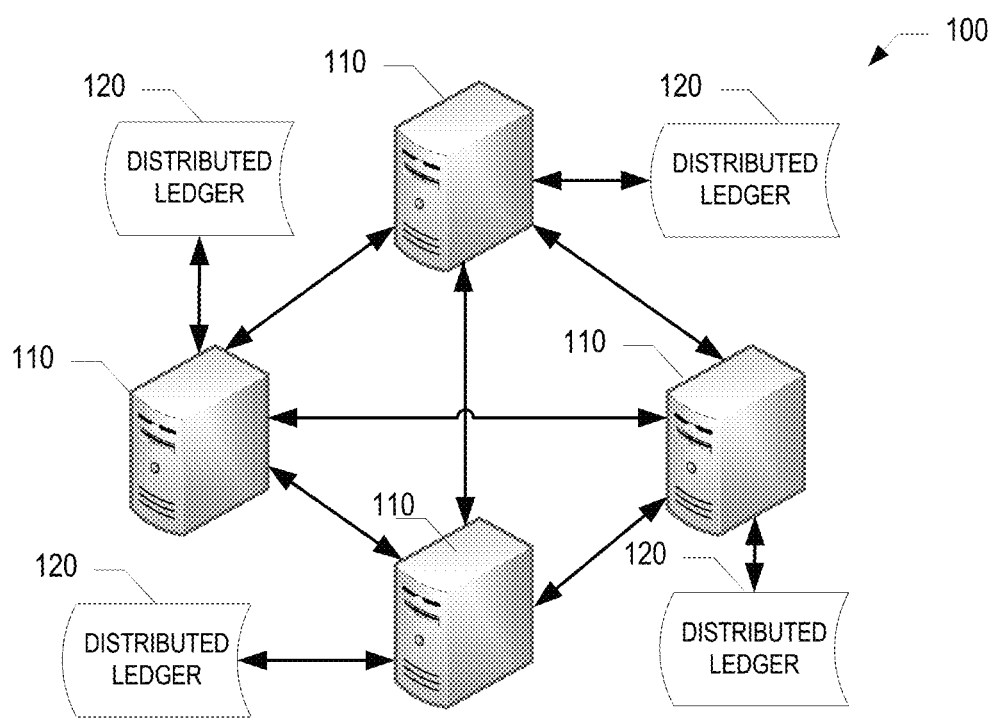
Figure 2:
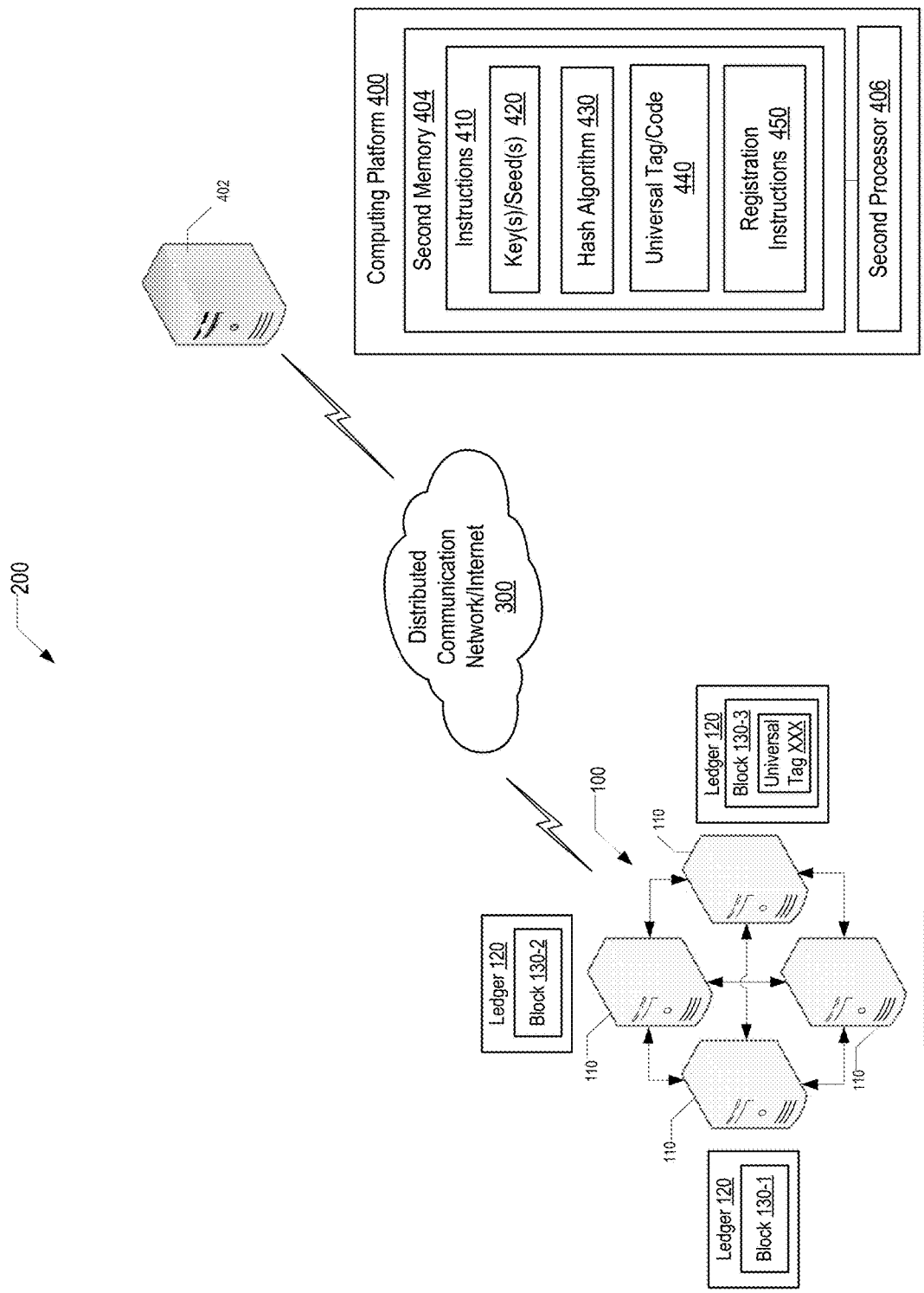
Figure 3:
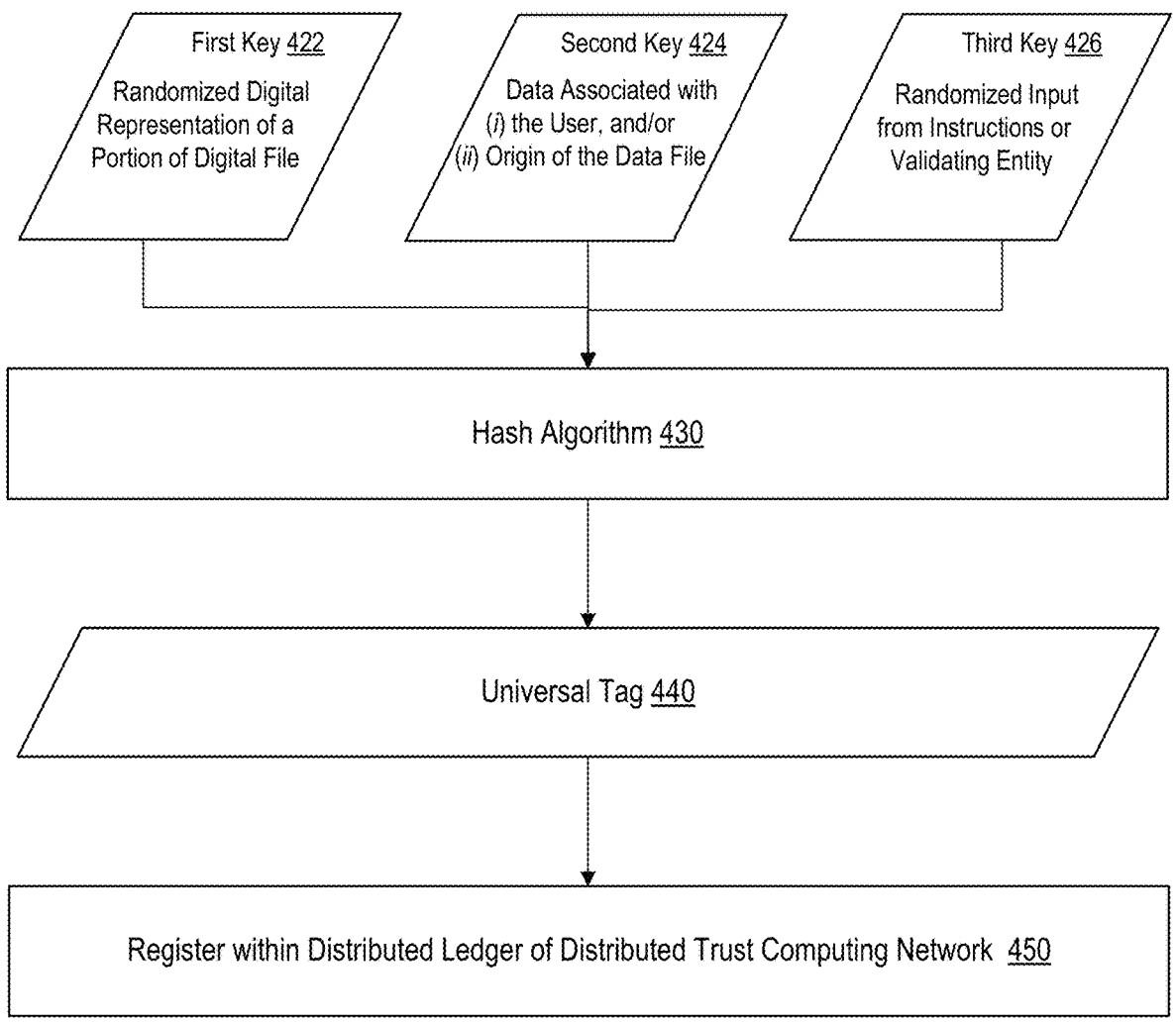
Figure 4:
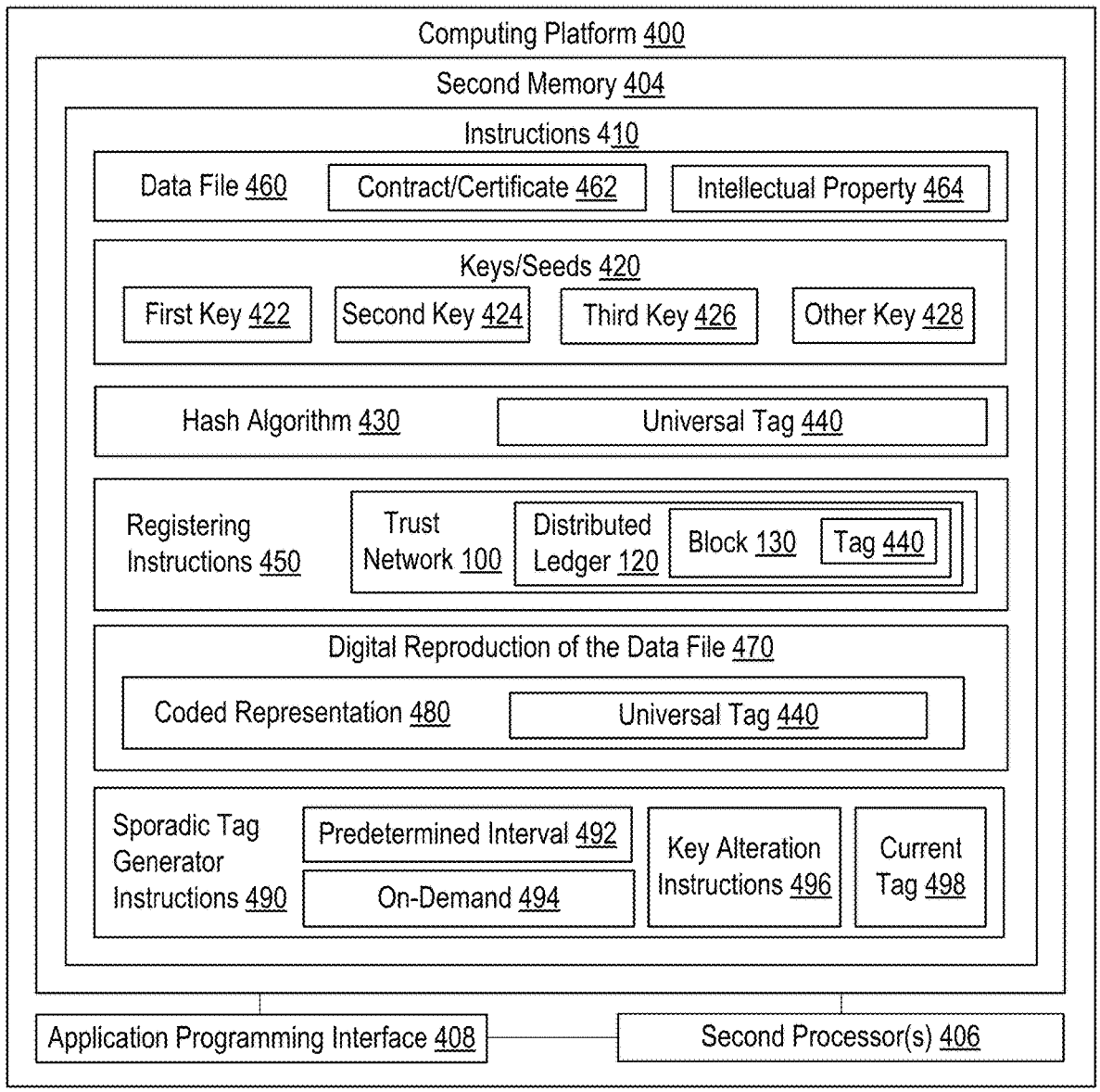
Figure 5:
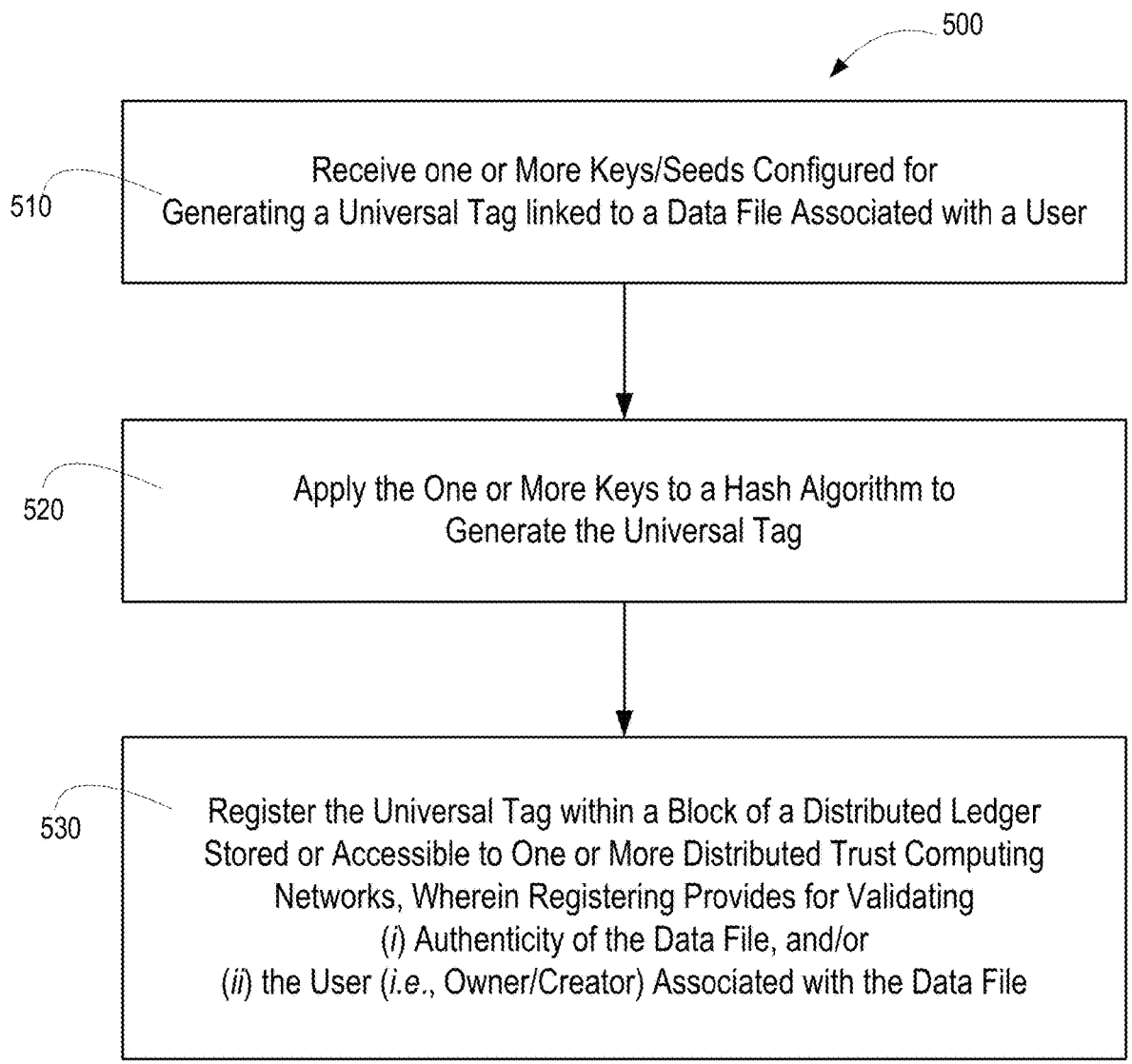
Figure 6:
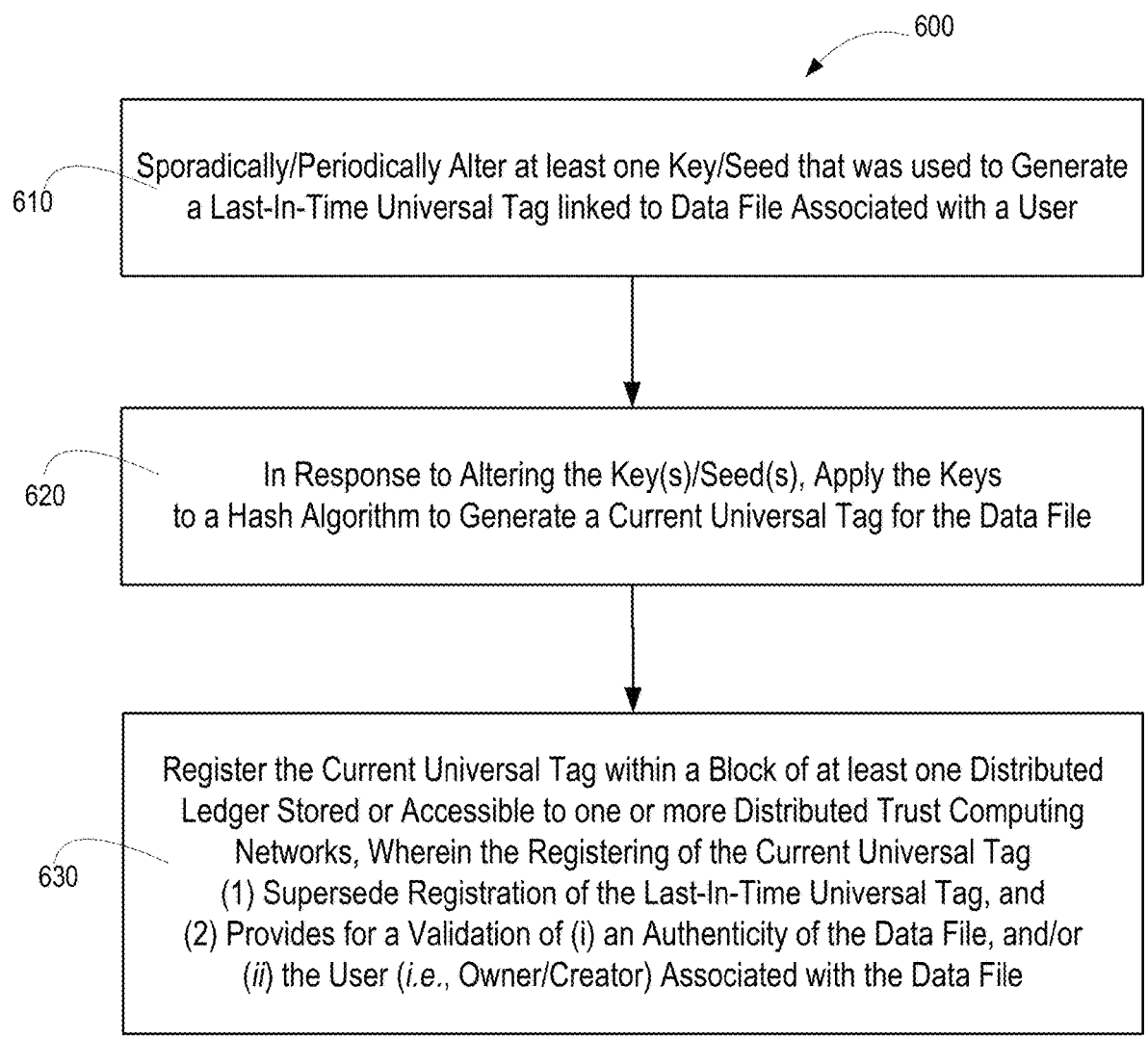

Having thus described embodiments of the disclosure in general terms, reference will now be made to the accompanying drawings, wherein:

FIG. 1 is a schematic diagram of a distributed trust computing network, such as a blockchain network, in accordance with some embodiments of the present disclosure;

FIG. 2 is a schematic diagram of a system for data protection using universal tagging, in accordance with some embodiments of the present disclosure;

FIG. 3 is a block diagram of a flow for generating and registering a universal tag linked to a data file, in accordance with some embodiments of the present disclosure; and FIG. 4 is a block diagram of a computing platform configured for data protection using universal tags linked to data file and, in some embodiments, sporadically generated universal tags, in accordance with some embodiments of the present disclosure;

FIG. 5 is a flow diagram of a method for data protection using universal tags linked to data files, in accordance with embodiments of the present invention; and FIG. 6 is flow diagram of a method for data protection using sporadically generated universal tags linked to data files, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for protecting the authenticity of data files and/or the owner/creator of a digital file through creation and registration of universal tags on a distributed trust computing network. The present invention serves to detect and/or prevent wrongful alteration of digital files and/or claims of ownership/creation by generating a unique universal tag and registering the universal tag with a distributed trust (e.g., computing network, which serves as a source of truth/verification for the universal tag. In this regard, a trusted entity (e.g., government agency, financial institution or the like) may serve as the universal tag generator and registrar and the tag serves as the official identifier (e.g., fingerprint, birthmark or the like) for entire lifecycle of the data file.

In specific embodiments of the invention the universal tag is generated by implementing a hash algorithm that uses one more input keys as the seed values. In specific embodiments of the invention, the input keys include one or more, and in some embodiments all of, (1) a first key comprising a randomized digital representation of at least a portion of the data file, (2) a second key comprising data associated with at least one selected from the group of (i) the user (e.g., digital signature of the user and biometric data and the like), and (ii) an origin of the data file (e.g., a date, a time and/or a geographic location at which the data file was created), and (3) a third key comprising a randomized input provided by the validating entity.

Once the universal tag is generated it is registering through storage and validation within a distributed ledger of at least one distributed trust computing network. The distributed trust computing network is configured to verify the universal tag and, in doing so, validates at least one of (i) an authenticity of the data file, and (ii) the user associated with the data file (e.g., rightful possessor and/or creator of the digital file).

Turning now to the figures, FIG. 1 a schematic diagram is provided of an exemplary distributed trust computing network 100 otherwise referred to herein as a blockchain network or "block chain", in accordance with embodiments of the present invention. The distributed trust computing network 100 is a distributed database that maintains, e.g., a list of data records, or the like. In specific embodiments of the invention the data records may include universal tags linked to data files, which are verified by the distributed trust computing network in terms of (i) the authenticity of the data file, and/or (ii) the user associated with the data file (e.g., rightful possessor and/or creator of the digital file). The security of the data maintained within the trust network is enhanced by the distributed nature of the network/block chain. The distributed trust computing network 100 typically includes several nodes 110, which may be one or more systems, machines, computers, databases, data stores or the like operably connected with one another. In some instances, each of the nodes 110 or multiple nodes 110 are maintained by different entities. A distributed trust computing network 100 typically works without a central repository or single administrator. One well-known application of a distributed trust computing network/block chain is the public ledger of transactions for cryptocurrencies such as used in bitcoin. The data records recorded in the distributed trust computing network/block chain are enforced cryptographically and stored on the nodes 100 of the block chain.

A distributed trust computing network 100 provides numerous advantages over traditional storage networks/databases. A large number of nodes 110 of a trust network may reach a consensus regarding the validity of resources maintained with a block of the blockchain, in the context of the present invention the validity of a universal tag maintained on a ledger 120. Additionally, when multiple versions of the universal tag exist on the ledger 120, multiple nodes 110 can converge on the most up-to-date version of the universal tag, such that the most-up-to-date version of the universal tag is the only validated universal tag. For example, in the case of a universal tag, any node 110 within the distributed trust computing network 100 that stores a record, such as a universal tag, can determine within a level of certainty whether the record can be authenticated/authorized to take place and become final by confirming that no conflicting records are confirmed by the distributed trust computing network/block chain elsewhere.

The blockchain chain typically has two primary types of records. The first type is the record type, which consists of the actual data stored in a block 130 within a distributed ledger 120. The second type is the block type, which are records that confirm when and in what sequence certain events became recorded as part of the blockchain. Records, such as a universal tags records, and the events associated therewith are created by participants using the blockchain in its normal course of business, for example, when a universal tag is received, a block(s) 130 is created by users known as "miners" who use specialized software/equipment to create blocks 130. Holders (also, referred to as users) of a block 130 of the blockchain agree to store a universal tag within the distributed trust computing network 100 and the related universal tag records are passed around to various nodes 110 of the distributed trust computing network 100. A "valid" universal tag or related event is one that can be validated based on a set of rules that are defined by the particular system implementing the distributed trust computing network/block chain. For example, in the case of universal tags, a valid universal tag is one that authenticates data in the data file to which it is linked and/or the user/creator/owner of the data file and authorizes entities to access the distributed ledger 120 to gain access to the universal tag.

A distributed trust computing network/block chain 100 is typically decentralized-meaning that a distributed ledger 120 (i.e., a decentralized ledger) is maintained on multiple nodes 110 of the trust network/block chain 100. One node 110 in the distributed trust computing network 100/block chain may have a complete or partial copy of the entire ledger 120 or set of records and/or blocks 130 on the distributed trust computing network 100/block chain. Events are initiated at a node 110 of a distributed trust computing network 100/block chain and communicated to the various nodes 110 of the distributed trust computing network 100/blockchain. Any of the nodes 110 can validate a universal tag/record or an associated event, add the universal tag/record or the details of the storage event to its copy of the distributed ledger 120, and/or broadcast the record or details of the storage event, its associated validation (in the form of a block 130) and/or other data to other nodes 110. The distributed trust computing network 100 shown in FIG. 1 is configured to perform one or more of the steps or functions performed by the system shown in FIG. 2, the computing platform shown in FIG. 4 and the methods described by FIGS. 5-6.

Referring to FIG. 2, a block diagram is presented of a system 200 for protecting data by generating and registering within a distributed trust computing network a universal tag that is linked to a data file, in accordance with embodiments of the present invention. The system 200 includes a distributed trust computing network 100 as described in relation to FIG. 1. The distributed trust computing network 100 includes a plurality of decentralized nodes 110. Each decentralized node 110 having a first memory (not shown in FIG. 2) and at least one first processor (not shown in FIG. 2) in communication with the first memory. The first memory of the decentralized nodes 110 is configured to store at least a portion of a distributed ledger 120 that includes a plurality of blocks 130-1-130-4. The processors of distributed trust computing network 100 are configured to certify/validate that the blocks 130-3 of data are authentic and unaltered.

The system additionally includes a computing platform 400 disposed within a distributed communication network 200, such as the Internet and/or intranets. The computing platform 400 may comprise one or more computing devices, for example server(s) 402 or the like. In specific embodiments of the system, the computing platform 400 is under the control of a trusted entity, such as a government agency, financial institution or the like. The computing platform 400 includes a second memory 404 and at least one second processor 406 in communication with the second memory 404.

The second memory stored instructions 410 that are executable by second processor 406. The instructions 410 are configured to receive one or more keys/seeds that are used to generate a universal tag/code 440 for a data file. While the data file may include anything in digital form, in relevant embodiments of the invention, the data file may include a document to which a user is a party to (e.g., a binding contract, a purchase agreement, a birth certificate, a marriage license or the like) or intellectual property created or possessed by the user (e.g., music, video, digital work of visual art, literary work, formula/trade secret/invention or the like). The one or more keys are subsequently applied to a hash algorithm 430 or any other encryption means to generate the universal tag 440/code.

The instructions 410 are configured to include registration instructions 450 that are configured to register the universal tag 440 within a block 130-3 of at least one distributed ledger 120 stored or accessible to one or more distributed trust computing networks 100. The registering of the universal tag 440 within the distributed trust computing network 100 provides for validating (i) the authenticity of the data file and/or (ii) the user as the rightful possessor/owner of the data file.

Referring to FIG. 3 a flow diagram is presented for generating a universal tag and registering the tag within a distributed trust computing network, in accordance with embodiments of the present invention. In accordance with specific embodiments of the invention, the keys/seed 420 used as the inputs to the has algorithm 430 for generating the universal tag 440 include first key 422, second key 424 and third key 426.

First key 422 includes a randomized digital representation of at least a portion of the digital file. In this regard, the randomized digital representation may include any portion or segment of the digital file. For example, an initial clip of an audio or video file, the initial pages of a literary work/book or, in other embodiments, any clip of the audio or video file or any pages/segments of the literary work/book. In other embodiments of the invention the randomized digital representation may include the entirety of the digital file. For example, a randomized digital representation of a binding contract, a birth certificate or other digital document associated with the user.

Second key 424 includes data associated with (i) the user and/or (ii) the origin of the data file. Data associated with the user may include, but is not limited to, biometric data (e.g., signature, voice, facial image, fingerprint of the user). Data associated with the origin of the data file may include, but is not limited to, a date/time at which the data file was created/completed, a geographic location at which the data file was created and the like.

Third key 426 includes a randomized input provided by the instructions 410 or received by the validating entity (e.g., government agency, financial institution or the like).

The hash algorithm 430 used to generate universal tag 440 may be SHA-256 (32 byte), SHA-512 (64 byte) or any other suitable has algorithm. Once the universal tag 440 has been created it may be subsequently de-hashed to validate the key(s), verify that the data file has not been tampered with and that the data in the data file is authenticate.

As previously discussed, the registration instructions 450 may configured to store the universal tag 440 on one or more distributed ledgers 120 stored within or accessible to one or more distributed trust computing networks 100. In other words, the registration instructions 450 may register the universal tag 440 on multiple different distributed trust computing networks 100.

Referring to FIG. 4 a block diagram is depicted of the computing platform 400 configured for generating a universal tag linked to a data file and registering the universal tag on a distributed trust computing network, in accordance with embodiments of the present invention. Computing platform 400, which comprise one or more computing devices (e.g., personal computers, servers or the like), is configured to execute instructions 410, such as algorithms, modules, routines, applications and the like. Computing platform 400 includes second memory 404, which may comprise volatile and non-volatile memory, such as read-only and/or random-access memory (RAM and ROM), EPROM, EEPROM, flash cards, or any memory common to computing platforms). Moreover, second memory 404 may comprise cloud storage, such as provided by a cloud storage service and/or a cloud connection service.

Further, computing platform 400 also includes at least one second processor 406, which may be an application-specific integrated circuit ("ASIC"), or other chipset, logic circuit, or other data processing device. Second processor 406 may execute one or more application programming interface (APIs) 408 that interfaces with any resident programs, such as instructions 410 or the like, stored in the second memory 404 of the computing platform 400 and any external programs. Second processor 406 may include various processing subsystems (not shown in FIG. 4) embodied in hardware, firmware, software, and combinations thereof, that enable the functionality of computing platform 400 and the operability of the computing platform 400 on the distributed computing network 200 (shown in FIG. 2). For example, processing subsystems allow for initiating and maintaining communications and exchanging data with other networked devices. For the disclosed aspects, processing subsystems of second processor 406 may include any subsystem used in conjunction with instructions 410 and related tools, routines, sub-routines, algorithms, sub-algorithms, sub-modules thereof.

Computing platform 400 may additionally include a communications module (not shown in FIG. 4) embodied in hardware, firmware, software, and combinations thereof, that enables electronic communications between the computing platform 400 and other network devices, such as those shown in FIG. 2. Thus, communication module may include the requisite hardware, firmware, software and/or combinations thereof for establishing and maintaining a network communication connection with one or more distributed trust.

Second memory 404 of computing platform 400 stores instructions 410 configured to generate a universal tag linked to a data file and register the universal tag within a distributed ledger of a distributed trust computing network, in accordance with embodiments of the present invention. In specific embodiments of the invention the instructions 410 may be implemented by a trusted entity, such as a government agency, financial institution or the like.

The instructions 410 are configured to receive one or more keys/seeds 420 configured for generating a universal tag 440 linked to a data file 460. As previously discussed, the data file 460 may include a contract/certificate 462 document to which a user is a party to (e.g., a binding contract, a purchase agreement, a birth certificate, a marriage license or the like) or intellectual property 464 created or possessed by the user (e.g., music, video, digital work of visual art, literary work, formula/trade secret/invention or the like).

As discussed in relation to FIG. 3, the one or more keys/seeds 420 may include one or more, and in specific embodiments all of, a first key 422, a second key 424 and a third key 426. First key 422 includes a randomized digital representation of at least a portion of the digital file. Second key 424 includes data associated with (i) the user and/or (ii) the origin of the data file. Third key 426 includes a randomized input provided by the instructions 410 or received by the validating entity (e.g., government agency, financial institution or the like). In other embodiments of the invention, one or more other keys 428 may be used to generate the universal tag 440.

In response to receiving the one or more keys 420, the instructions 410 are further configured to apply the one or more keys to a hash algorithm 430 to generate the universal tag 440. By way of example only, the hash algorithm may be SHA-256 (32 bytes), SHA-512 (64 bytes) or the like.

In response to generating the universal tag 440, registration instructions 450 are executed to register the universal tag 440 within a block 130 of one or more distributed ledgers 120 stored within or accessible to one or more distributed trust computing networks 100. As previously discussed, the registering of the universal tag 100 within the distributed computing network 100 provides for verifying the validity of (i) the data file and/or (ii) the user (i.e., creator/rightful possessor) associated with the data file. Thus, registering the universal tag 440 within the distributed trust computing network 110 serves to subsequently, upon accessing the universal tag 440 within the trust network 100, confirm that the data has been not been tampered with in the data file and/or verify that the user is the rightful creator and/or possessor of the data file.

In optional embodiments of the invention, instructions 410 may be further configured to generate a coded representation 480 of the universal tag 440 (e.g., a hyperlink, a barcode, QR code or the like) and, in further specific embodiments of the invention, embed the coded representation 480 in a digital reproduction of the data file 470 (i.e., a data file other than the original data file). The coded representation 480 may be embedded as visible coded representation (e.g., embedded within/affixed to a document) or the coded representation may be invisible (e.g., embedded with an audio or visual data file). In specific embodiments of the invention, the coded representation 480 is configured to provide access to the universal tag 440 stored within the distributed trust computing network 100 and, if the accessor possess the de-hash key (typically provided by the user), the accessor is able to validate that the data in the data file has not been tampered with and/or that the user is the creator/rightful possessor.

In further specific embodiments of the invention, the instructions 410 include sporadic tag generator instructions 490 configured to sporadically/periodically generate a current universal tag 498 linked to data file 460 and register the current universal tag 498 within a block 130 of one or more distributed ledgers 120 stored within or accessible to a distributed trusts computing network 100. The sporadic/period generation of universal tags may occur at a predetermined time interval 492 (e.g., milliseconds to hours intervals) or may occur on-demand 494 of the user and/or the trusted validating entity (e.g. government agency, financial institution or the like). By providing for a universal tag that constantly is changing, the present invention adds an additional layer of data protection, specifically preventing a wrongdoer who has decoded the hash algorithm from claiming possession/creation of the digital file or the like.

The sporadic tag generator instructions 490 include key alteration instructions 496 configured to alter, at the predetermined interval 492 or on-demand 494, at least one key/seed 420 used to generate a last-in-time universal tag 440 linked to a data file 460. In specific embodiments of the invention, altering at least one key may include altering the first key 422 by changing the portion of the digital file that is digitally represented, and/or altering the second key 424 by changing the user data and/or origin data, and/or altering the third key by changing the randomized input provided by the instructions 410 or received by the validating entity. Once the one or more keys have been altered, the keys 420 included the altered keys are applied to the hash algorithm 430 to generate a current universal tag 498. In response to generating the current universal tag 498, the current universal tag 498 is registered within a block 130 of the one or more distributed ledger 120 stored or accessible to the one or more distributed trust computing networks 100. The registration of the current universal tag 498 serves to supersede the registration of the last-in-time universal tag, such that, the last-in-time universal tag no longer serves to validate the (i) the integrity of the data in the data file 460 and/or (ii) the user as the creator/rightful possessor of the data file 460.

Referring to FIG. 4 a flow diagram is presented of a method 500 for data protection that includes generating a universal tag linked to a data file and registering the tag within a distributed trust computing network, in accordance with embodiments of the present invention. At Event 510, one or more keys/seeds are received that are configured for generating a universal tag linked to a data file that is associated with a user. The data files may include a document or the like to which the user is a party to or intellectual property created by or rightfully possessed by the user. In specific embodiments of the method, the one or more keys include at least one, and in some embodiments all of, a first key this includes a randomized digital representation of at least a portion of the digital file, a second key that includes data associated with (i) the user and/or (ii) the origin of the data file and a third key that includes a randomized input provided by the a random generator or the validating entity.

At Event 520, in response to receiving the one or more keys/seed, the keys/seeds are applied to a has algorithm to generate a universal tag, otherwise referred to a universal tag or the like. The has algorithm may be any conventional has algorithm, for example, SHA-256 (32 byte), SHA-512 (64 byte) or the like.

At Event 530, the universal tag is registered within a block of at least one distributed ledger stored within or accessible to at least distributed trust computing network. The registering of the universal tag within the distributed trust computing network provides for validating at least one of (i) the authenticity of the data file, and/or (ii) the user associated with the data file (e.g., the creator and/or rightful possessor of the data file.

In alternate embodiments of the method, not shown in FIG. 5, a coded representation (e.g., hyperlink, barcode, Quick Response (QR) code) of the universal tag may be generated and, in further alternate embodiments, the coded representation may be embedded, visually or covertly, within a digital reproduction of the data file. In other alternate embodiments of the method, the universal tag is applied to the hash algorithm (i.e., de-hashing) to validate the keys (i.e., verify that the data has not been tampered with and/or verify the user as the creator/rightful possessor). In other alternate embodiments of the method, a digital representation of the data file is stored along with the universal tag within the block of distributed ledger or within a separate block of the distributed ledger. In such embodiments of the method, a coded representation of the universal tag may generated which, when de-coded, provides access to the digital representation of the data file stored within at least one distributed trust computing networks and validation of at least one selected from the group of (i) the authenticity of the data file, and (ii) the user associated with the data file.

Referring to FIG. 6 a flow diagram is depicted of a method 600 for protecting data by sporadically/periodically generating universal tags and registering such within a distributed trust computing network, in accordance with embodiment of the present invention. At Event 702, at least one key/seed that was used to generate a last-in-time universal key linked to a data file is altered. As previously discussed, the data file may be a document to which a user is a party to or intellectual property created by or rightfully possessed by the user. In specific embodiments of the method, the one or more keys include at least one, and in some embodiments all of, a first key this includes a randomized digital representation of at least a portion of the digital file, a second key that includes data associated with (i) the user and/or (ii) the origin of the data file and a third key that includes a randomized input provided by the a random generator or the validating entity. This, altering the one or more keys may include, but is not limited to, altering the first key by changing the portion of the digital file that is digitally represented, and/or altering the second key by changing the user data and/or origin data, and/or altering the third key by changing the randomized input provided by a random generator and/or the validating entity.

In response to altering the one or more keys, at Event 620, the keys including the one or more altered keys are applied to the hash algorithm to generate a current universal tag. As previously discussed, the altering of the key(s) and generation of universal tags occurs sporadically/periodically on a predetermined schedule and/or on-demand of the user and/or validating entity. In those embodiments in which the altering of the key(s) and generation of universal tags occurs on-demand, the need to change universal tags may be triggered by action associated with the data file that has jeopardized the integrity of the data file.

In response to generating the current universal tag, at Event 630, the current universal tag is registered within a block of at least one distributed ledger stored within or accessible to at least one distributed trust computing network. Registering of the current universal tag provides for superseding the last-in-time registered universal tag, such that, the last-in-time registered universal tag is no longer effective for validating the integrity of the data file and/or the user associated with the data file. In other words, registering the current universal tag provides for the current universal tag to provide validation for the (i) integrity of the data file, and/or (ii) the user as creator/rightful possessor the data file.

In alternate embodiments of the method, not shown in FIG. 6, the blocks of the distributed ledger that store the universal tags blocks of the at least one distributed computing network that store registered universal tags provide for an accessible historical database that indicates a time period for which each of the registered universal tags was, in effect, a current registered universal tag (i.e., a validating universal tag). In other alternate embodiments of the method, a digital representation of the data file is stored along with the universal tag within the block of distributed ledger or within a separate block of the distributed ledger. In such embodiments of the method, a coded representation of the current universal tag may generated which, when de-coded, provides access to the digital representation of the data file stored within at least one distributed trust computing networks and validation of at least one selected from the group of (i) the authenticity of the data file, and (ii) the user associated with the data file.

Thus, present embodiments of the invention provide for a universal tag which is linked to the content of a data file for protecting the authenticity of the data file and/or the owner/creator of a digital file. The universal tag is linked to the content in the data file via one or more input keys/seeds that are used to generate the universal tag and rely on data associated with the content. Once generated, the universal tag is registered on a distributed ledger of at least on distributed trust computing network, which acts as a source of truth to validate the universal tag and, as such, validate (i) an authenticity of the data file, and/or (ii) the user associated with the data file (e.g., rightful possessor and/or creator of the digital file).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for data protection, the system comprising:
at least one distributed trust computing network comprising a plurality of decentralized nodes, each decentralized node having a first memory and at least one first processor in communication with the memory, wherein the first memory of the decentralized nodes is configured to store at least one distributed ledger comprising a plurality of blocks of data; and
a computing platform disposed in a distributed computing network and including a second memory and at least one second processor in communication with the second memory, wherein the second memory stores instructions that are executable by the second processor and configured to:
receive a plurality of keys configured for generating a universal tag that is linked to a data file associated with a user, wherein the plurality of keys include a first key comprising a randomized digital representation of at least a portion of the data file, a second key comprising data associated with at least one selected from the group of (i) the user, and (ii) an origin of the data file, and a third key comprising a randomized input;
apply the plurality of keys to a hash algorithm to generate the universal tag; and
register the universal tag within a block of at least one distributed ledger stored or accessible to one or more of the at least one distributed trust computing networks,
wherein the registering of the universal tag within the one or more distributed trust computing networks provides for validating at least one selected from the group of (i) an authenticity of the data file, and (ii) the user associated with the data file.

2. The system of claim 1, wherein the second key further comprises data associated with the user including one or more of a digital signature of the user and biometric data from the user.

3. The system of claim 1, wherein the second key further comprises data associated with the origin of the data file including one or more of a date, a time and a geographic location at which the data file was created.

4. The system of claim 1, wherein the third key comprising the randomized input, further defines the randomized input as selected from the group consisting of (i) generated by the instructions and (ii) provided by a validating entity.

5. The system of claim 1, wherein the data file associated with the user is one of (i) a document to which the user is a party to, or (ii) intellectual property created by the user.

6. The system of claim 1, wherein the instructions are further configure to create a coded representation of the universal tag, wherein the coded representation is configured to be decoded to provide validation of at least one selected from the group of (i) the authenticity of the data file, and (ii) the user associated with the data file.

7. The system of claim 6, wherein the instructions are further configured to embed the coded representation within digital reproductions of the data file.

8. The system of claim 1, wherein the instructions are further configured to apply the universal tag to the hash algorithm to validate the plurality of keys.

9. A computer-implemented method for data protection, the computer-implemented method is implemented by one or more processing devices and comprises:
receiving a plurality of keys configured for generating a universal tag linked to a data file associated with a user, wherein the plurality of keys include a first key comprising a randomized digital representation of at least a portion of the data file, a second key comprising data associated with at least one selected from the group of (i) the user, and (ii) an origin of the data file, and a third key comprising a randomized input;

applying the plurality of keys to a hash algorithm to generate the universal tag; and registering the universal tag within a block of at least one distributed ledger stored or accessible to one or more distributed trust computing networks, wherein the registering of the universal tag within the one or more the distributed trust computing networks provides for validating at least one selected from the group of (i) an authenticity of the data file, and (ii) the user associated with the data file.

10. The computer-implemented method of claim 9, wherein the second key further comprises data associated with the user including one or more of a digital signature of the user and biometric data from the user.

11. The computer-implemented method of claim 9, wherein the second key further comprises data associated with the user including one or more of a digital signature of the user and biometric data from the user.

12. The computer-implemented method of claim 9, wherein the third key comprising randomized input, further defines the randomized input as selected from the group consisting of (i) generated the instructions and (ii) provided by a validating entity.

13. The computer-implemented method of claim 9, further comprising creating a coded representation of the universal tag, wherein the coded representation is configured to be decoded to provide validation of at least one selected from the group of (i) the authenticity of the data file, and (ii) the user associated with the data file.

14. The computer-implemented method of claim 13, further comprising embedding the coded representation within digital reproductions of the data file.

15. A computer program product including a non-transitory computer-readable medium, the computer-readable medium comprising:

a first set of codes for causing a computer to receive a plurality of keys configured for generating a universal tag linked to a data file associated with a user, wherein the plurality of keys include a first key comprising a randomized digital representation of at least a portion of the data file, a second key comprising data associated with at least one selected from the group of (i) the user, and (ii) an origin of the data file, and a third key comprising a randomized input;

a second set of codes for causing a computer to apply the plurality of keys to a hash algorithm to generate the universal tag; and a third set of codes for causing a computer to register the universal tag within a block of at least one distributed ledger stored or accessible to one or more distributed trust computing networks, wherein the registering of the universal tag within the one or more the distributed trust computing networks provides for validating at least one selected from the group of (i) an authenticity of the data file, and (ii) the user associated with the data file.

\* \* \* \* \*